Figure 1:
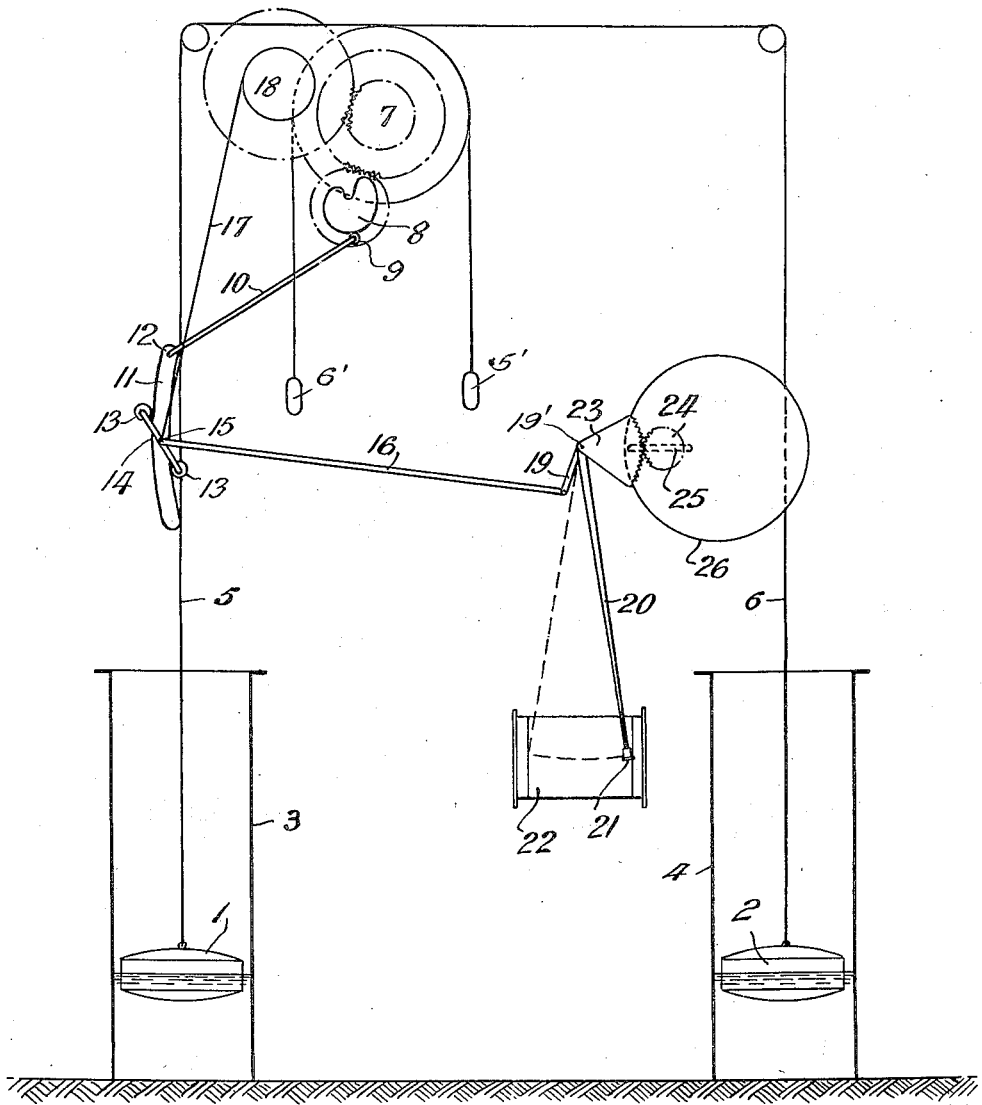

Dec. 2, 1930.  W. G. KENT ET AL  1,783,880
APPARATUS FOR MEASURING THE FLOW OF LIQUIDS
Filed April 12, 1930    5 Sheets-Sheet 1

Inventors
Walter George Kent,
Edward William Hovenden
deceased,
Jack Reginald Hovenden
Alice Harriet Hovenden
Executors.
By Thomas A. Jenkes Jr.
Attorney Fig 4.
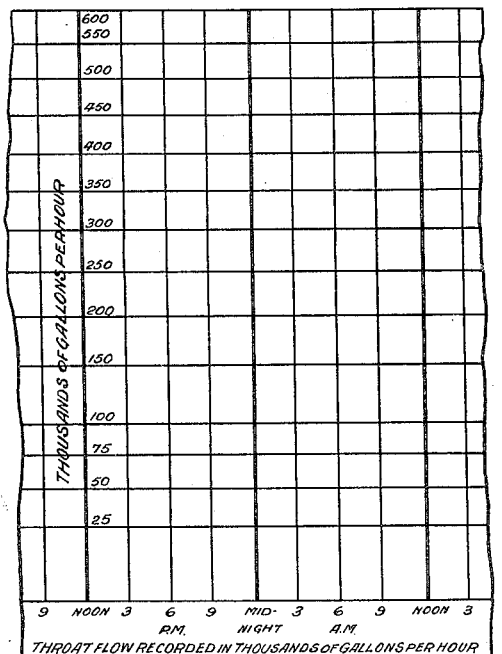
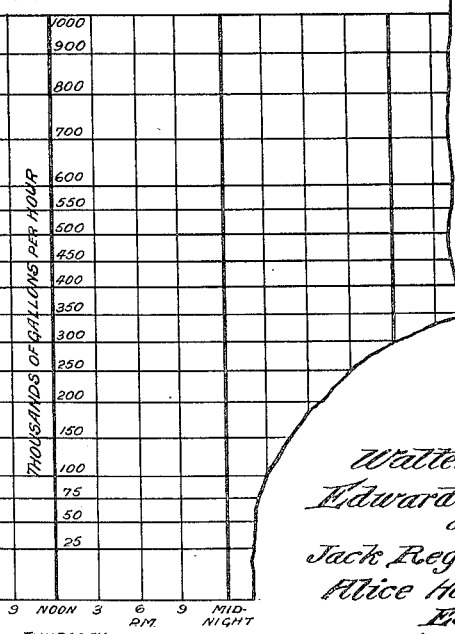

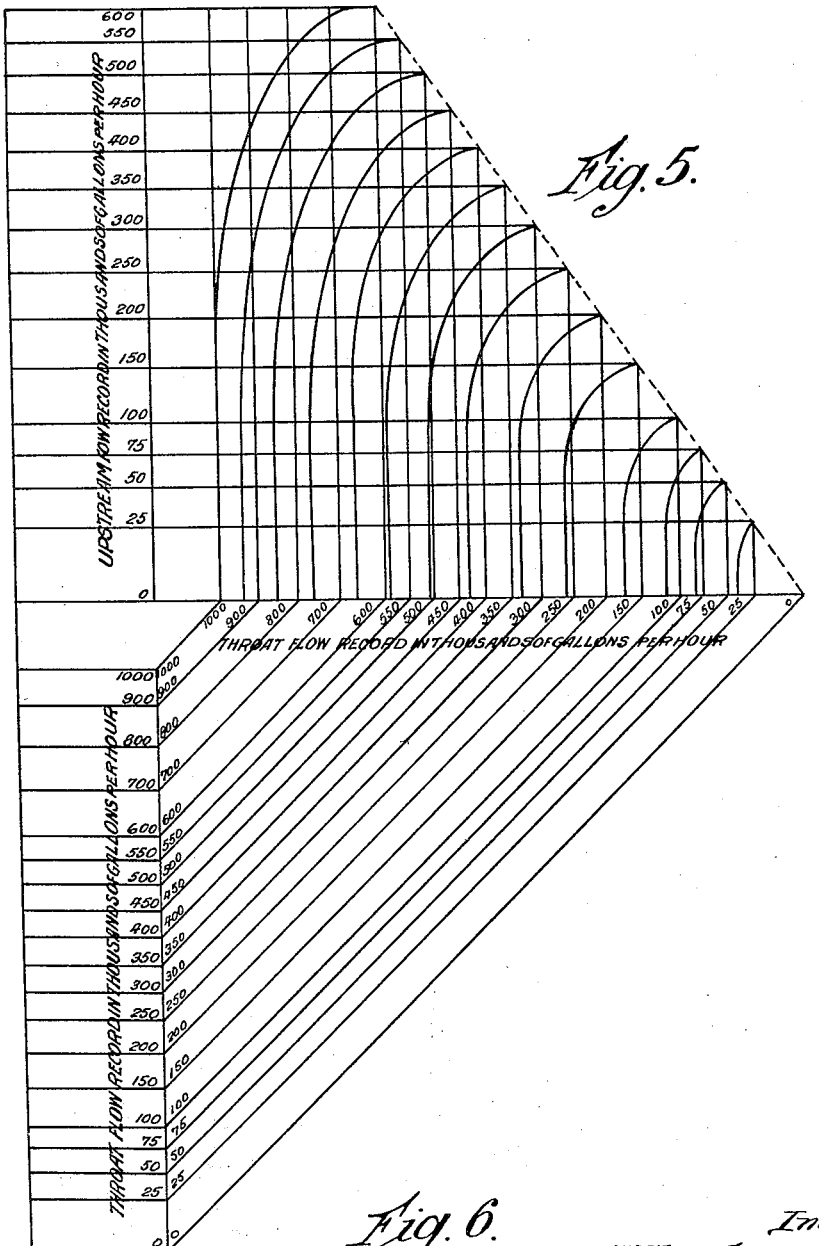
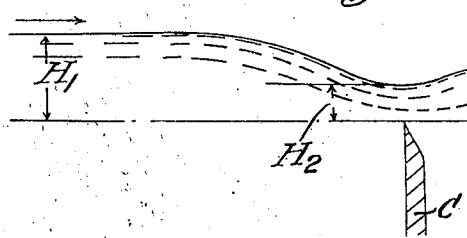

Patented Dec. 2, 1930

1,783,880

UNITED STATES PATENT OFFICE

WALTER GEORGE KENT, OF LUTON, AND EDWARD WILLIAM HOVENDEN, DECEASED, LATE OF LUTON, ENGLAND, BY JACK REGINALD HOVENDEN, OF LONDON, ENGLAND, AND ALICE HARRIET HOVENDEN, OF BEDFORD, ENGLAND, EXECUTORS, ASSIGNORS TO BUILDERS IRON FOUNDRY, OF PROVIDENCE, RHODE ISLAND

APPARATUS FOR MEASURING THE FLOW OF LIQUIDS

Application filed April 12, 1930, Serial No. 443,858, and in Great Britain November 3, 1928.

This invention relates to improvements in apparatus for measuring the flow of liquids in open channels.

For measuring the flow of liquids, such as sewage or irrigation water, in open channels, a Venturi flume can be employed consisting of a projection on both sides or on one side only of the channel, the approaches on the upstream side being gradual and those on the downstream side also being gradual, but preferably of a longer slope than on the upstream side.

When the liquid is flowing, the velocity increases at the throat of the Venturi flume, causing an increased kinetic energy and a fall of potential energy, that is, a fall of head, and as the liquid flows along the diverging part of the flume, the velocity falls, causing the head to rise so that the net loss of head across the whole flume is very small.

Under free discharge conditions, the levels of liquid in the upstream and throat of the Venturi flume always retain the same ratio to one another at any given rate of flow, and an accurate record of the rate of flow can be obtained by measuring the level or head of liquid either in the throat or the upstream of the Venturi flume.

If, however, the Venturi flume be "drowned", i. e. if a resistance be created by the banking-up of the liquid, due to causes such as the closing of a sluice on the downstream side of the flume, or to an accumulation of solids or water on the downstream side, the level of liquid in the throat and upstream rises above their free discharge positions, that in the throat rising more than that in the upstream. By means of calculations and experiments, it has been found that the rate of flow under this drowned condition can be obtained from either of the following formulæ:—

$$Q = K W H_2 \sqrt{H_1 - H_2}$$

or $$Q = K_1 W H_1 \sqrt{H_1 - H_2},$$

where $Q$=rate of flow, $W$=width of the throat, $H_1$=level of liquid in the upstream of the flume, and $H_2$=level of liquid in the throat of the flume; $K$ and $K_1$=constants.

Similar conditions exist when a weir is employed in a channel in place of a Venturi flume, and the weir is liable to be drowned, which occurs when the level on the downstream side is above the crest or sill of the weir. In this case, $W$=width of the weir, $H_1$=the height of liquid above the crest of the weir at the upstream side thereof, and $H_2$=the height of liquid above and at the crest at the weir. By "downstream side" is meant the place at which $H_2$ is measured as indicated above.

The object of the present invention is to provide a Venturi flume or the like working in conjunction with an indicator, recorder or counter, by means of which the correct rate of flow can be obtained, whether or not drowning of the downstream exists.

In carrying out the present invention, we provide means operable by variations in the head, such as at the throat and upstream of a Venturi flume or the crest and upstream of a weir, whereby the true rate of flow of the liquid can be ascertained under drowned as well as under free discharge conditions.

The true rate of flow can be ascertained either by means of a chart, or automatically.

With free flow, the quantity of flow can readily be obtained from $H_2$ alone. However, for the same quantity of flow, under drowned conditions, $H_2$ will be higher than with free flow and the quantity then depends upon both $H_1$ and $H_2$, according to the formula:

$$Q = K H_2 \sqrt{H_1 - H_2},$$

which formula also applies to free flow. Therefore, since the apparatus utilizes this formula, it will give the true quantity of flow regardless of whether the flow is free or "drowned".

The reason this is true is that $Q$, the quantity of flow, depends on area times velocity, or in other words $$Q \alpha A V$$
or $Q = K_1 A V$
$A$ depends on $H_2$
$V$ depends on $H_1 - H_2$ Therefore $Q = K H_2 \sqrt{H_1 - H_2}$ K is substantially the same for either free or drowned flow.

Figure 2:
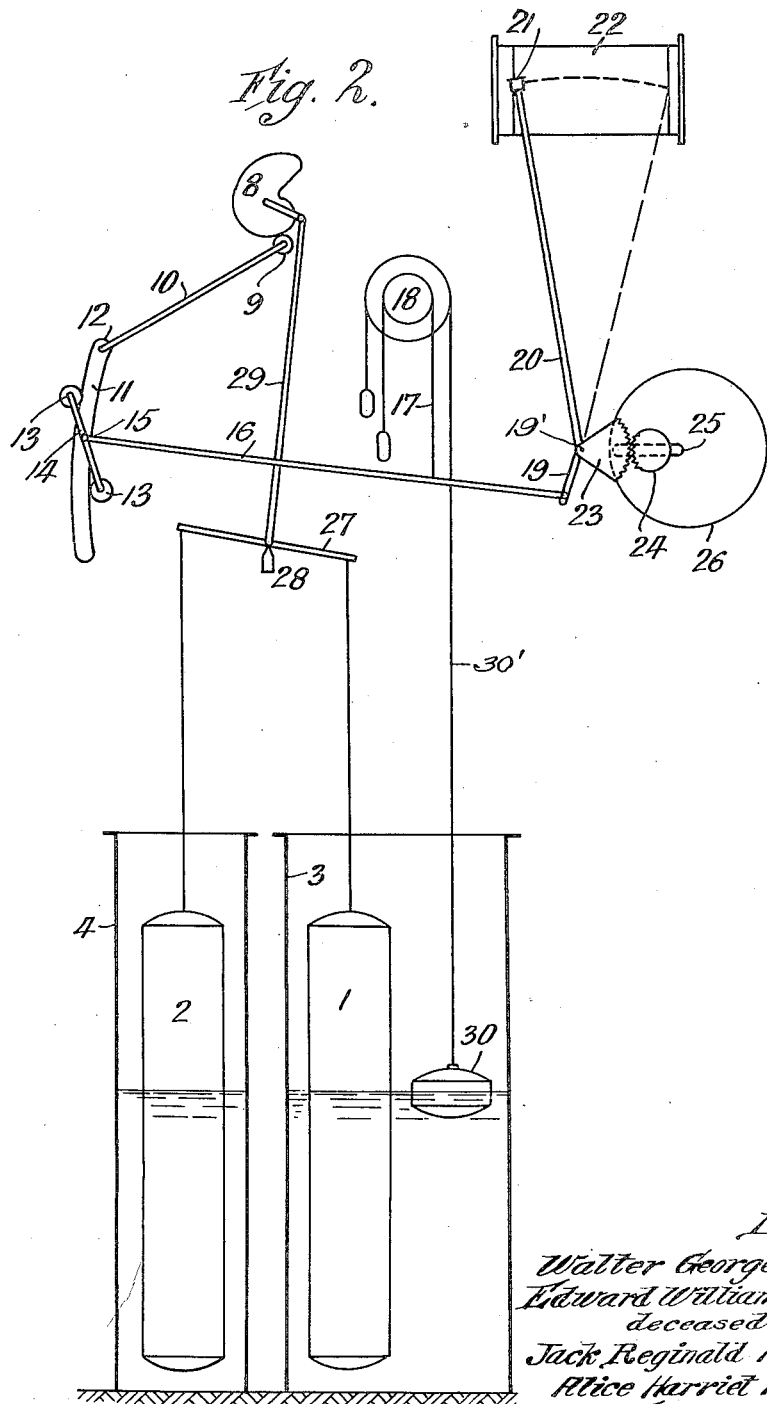
Figure 3:
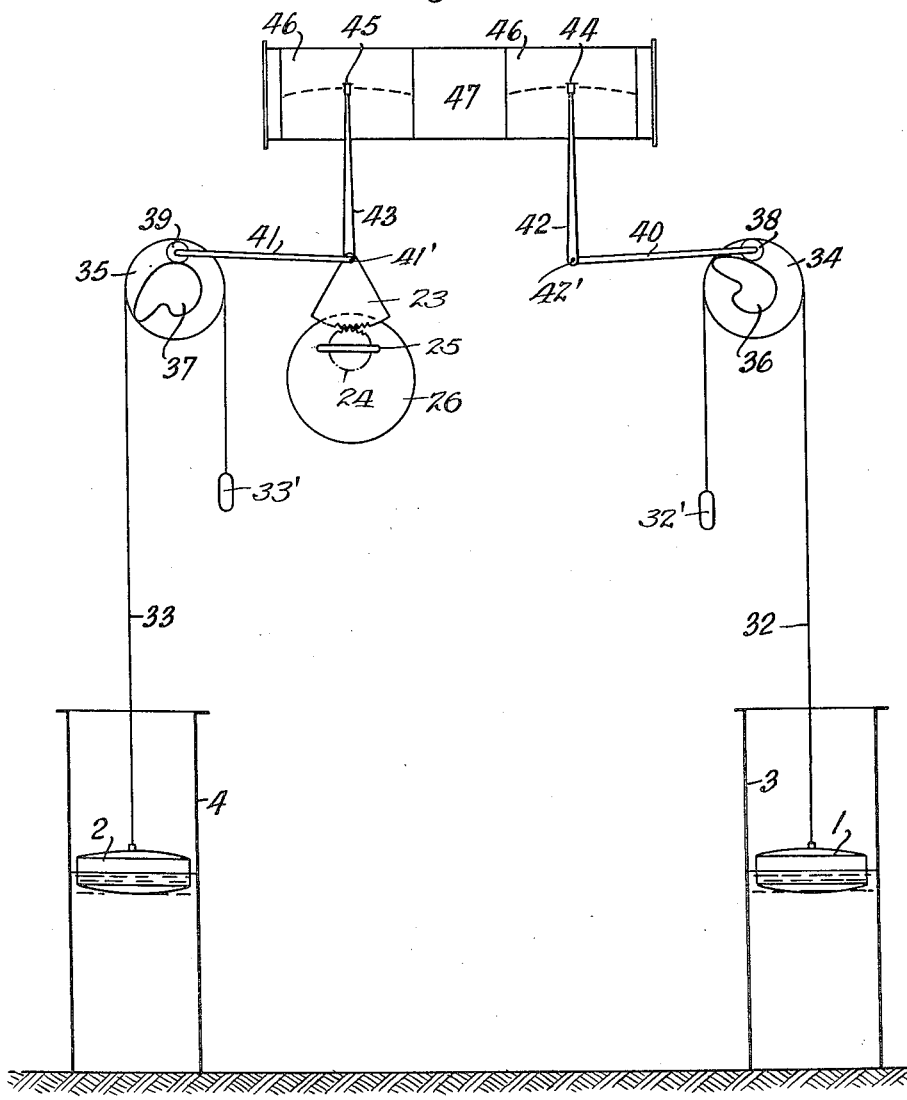

The invention is illustrated in the accompanying drawings, in which Figure 1 is a diagrammatic view of one form of construction, Figures 2 and 3 diagrammatic views of modified forms of construction, Figures 4 and 5 views of a portion of a second chart and of a chart of corrective curves for use with the arrangement shown in Figure 3, and Figure 6 a diagrammatic view of a weir under drowned conditions.

Referring to Figure 1, 1 and 2 are floats, the float 1 being located in a chamber 3 in communication with the throat of a Venturi flume, and the other float 2 being located in a chamber 4 in communication with the upstream end of the Venturi flume as is known in this art, and as shown in the patents to Stevens, 1,418,032, May 30, 1922 and Parshall, 1,417,941, May 30, 1922. To the floats 1, 2 are attached cords 5, 6 respectively, which terminate respectively in counterweights 5' and 6'; one of the cords passes to one side of a differential gear indicated at 7 and the other cord passes to the other side of the differential gear, the resultant movement of the differential gear thus being proportional to the difference between the level of liquid at the throat and the upstream side of the Venturi flume. The details of the differential form no part of this invention. The use of such a differential in an analogous way is shown at 4, Fig. 1 in the patent to Buckley 1,492,829, dated May 6, 1924. The movement of the differential is transmitted to a cam 8 against which bears a roller 9, the roller being moved by the cam a distance proportional to the square root of the difference between the level of liquid at the throat and upstream of the Venturi flume. The cam 8 is shaped substantially as shown in Fig. 1, and is a square root cam, of the type shown at 24 Fig. 3 of the patent to Weymouth 1,085,184, Jan. 27, 1914. This roller 9 is mounted upon a connecting arm 10 secured to a curved arm 11, arm 11 being curved substantially in an arc of a circle. The arm 11 is pivotally mounted at 12, and with arm 10 secured to it, forms in effect a bell crank lever pivoted at 12. On each side of the curved arm 11 rest rollers 13, the rollers 13 being mounted upon a link 14 pivotally mounted at 15 on one end of an actuating arm 16. To the actuating arm 16 is attached one end of a cord 17 which passes around a drum 18 actuated by that side of the differential 7 which is operated by the throat float 1. The lower roller 13 may be made sufficiently heavy so that both rollers will engage arm 11. The arm 16 is pivotally connected to an arm 19 which arm is pivoted on the fixed pivot 19'. Secured to arm 19 and movable therewith is an arm 20 carrying a pen 21 moving over a constantly rotated chart drum 22. The arm 19 is also rigidly secured to a sector 23 in mesh with a gear 24 rigidly secured to a planimeter wheel 25 connected to a counter of any suitable construction (not shown) and engaged on its periphery by a disc 26 rotated at a constant speed by any suitable type of driving mechanism, the speed of rotation of the planimeter wheel 25 being dependent upon its angular setting relatively to the disc 26 and change of angular setting being varied by the sector 23 and gear wheel 24 about an axis passing through the point of contact between the wheel 25 and disc 26.

When the wheel 25 is in the position shown in Fig. 1, it will be practically at rest. But if it is moved angularly, as by 23, it will rotate, because of its edge frictional contact with the constantly driven disk 26, and so will drive its counter at a rate which is a function of its angular setting. That is to say, planimeter wheel 25 forms a variable speed drive.

The movement of actuating arm 16 is the resultant of two factors; the first factor is that dependent on the angular position of the curved arm 11, which position is controlled by the square root of the differential of the two levels $H_1$ and $H_2$ in the two float chambers, as determined by cam 8, of the Venturi flume, or in other words, the factor $$\sqrt{H_1 - H_2}.$$

The other factor controlling the actuating arm 16 is the liquid level $H_i$ in one of the float chambers, which level is directly applied to actuating arm 16 by the cord 17, Figs. 1 and 2. The resultant movement of actuating arm 16 is therefore $$H_2\sqrt{H_1 - H_2}$$

The curved arm 11 is shaped in the arc of a circle so that in operation, when the differential gear is at zero, the carriage formed by the link 14 and rollers 13 can travel on the arm 11 without altering the record made by the pen or the counter.

When the differential gear is not at its zero position, the pen and the planimeter wheel 25 will be moved by the movement of the curved arm 11, and the amount of this movement will increase with the distance of the carriage from the pivoting point of the curved arm 11, so that the reading on the diagram and the counter will be proportional to $$H_2\sqrt{H_1 - H_2}.$$

In the arrangement illustrated in Figure 2, in which the same reference characters indicate the same parts as in Fig. 1, the movement proportional to the differential head is obtained by differential beam 27 pivoted on knife edges 28, and having an arm 29 pivoted to an arm fixed to the cam 8 for rotating it. The ends of the beam are respectively connected to the floats 1 and 2. The movement proportional to the level in the throat of the Venturi flume is obtained from the float 30 located in chamber 3, the float 30 being connected by cord 30' to drum 18, movement of the drum 18 is communicated to arm 16 by the cord 17.

In the arrangement illustrated in Figure 3, there is provided a duplex meter with two pens operating upon one chart. One pen is actuated by variations in head in the throat of the Venturi flume, and the other by variations in head in the flume at the upstream side of the Venturi flume.

The meter is so designed that the first pen records according to the formula $$Q = \frac{KW(H_2)^{3/2}}{B^{1/2}}$$

and the second pen records according to the formula $$Q = \frac{KW(H_1)^{3/2}}{A^{1/2}},$$

A and B being constants.

Under free discharge conditions, both pens will indicate the same and the correct rate of flow, but when drowned conditions occur, the pens will indicate different rates of flow and the true rate of flow can then be deduced from the two readings by a table or chart of corrective factors, or by a series of curves, such as shown in Figure 5.

One pen is controlled by the float 1 located in the chamber 3 connected to the throat of the Venturi flume and the other pen by the float 2 located in the chamber 4 connected to the upstream portion of the Venturi flume. Secured to the floats 1, 2 are cords 32, 33 respectively, tensioned by counterweights 32' and 33' respectively, which pass over drums 34, 35 fast with 3/2 power cams 36, 37 against which bear rollers 38, 39. The rollers are mounted at one of the ends of arms 40, 41 rigidly secured to arms 42, 43 carrying pens 44, 45 moving over charts 46 carried on a constantly rotated drum 47. Arms 40 and 41 are pivoted, respectively, at 42' and 41'. The whole arrangement is such that the pens 44, 45 are moved a distance proportional to $$H_2^{3/2}$$

and $$H_1^{3/2}$$

respectively.

When the upstream and throat diagrams do not indicate the same rate of flow, the corrective chart shown in Figure 5 is placed over the upstream and throat chart, of which a portion is shown in Figure 4.

From the point of the upstream reading, the corresponding horizontal line is followed to the corresponding curved line.

From the point of the throat reading, the corresponding diagonal line is followed to the corresponding vertical line, and the point at which the curved line cuts the vertical line indicates on the vertical scale the true rate of flow.

For example, if the upstream chart indicates a flow of 200,000 gallons per hour, and the throat chart indicates a flow of 300,000 gallons per hour, the actual flow is 150,000 gallons per hour.

One of the floats, preferably, as is shown, the upstream float, is provided with an integrating mechanism 23, 24, 25, 26 similar to that described with reference to Figure 1, for actuating a counter.

In Figure 6, C indicates the crest of a weir, $H_1$ the height of liquid above the crest of the weir at the upstream side thereof, and $H_2$ indicates the height of liquid above the crest at the weir.

What we claim is:—

1. In an apparatus for measuring the flow of liquid an open channel, the combination of restrictive means for creating a pressure difference at spaced points along the open channel when there is flow, the apparatus utilizing the formula $$H_2\sqrt{H_1-H_2},$$

where $H_1$ and $H_2$ indicate the different liquid levels created by the aforementioned restrictive means; float chambers in fluid communication with the channel at the points of pressure difference above mentioned; a float in each chamber; a differential device; means operatively connecting said differential device with each float; a square-root cam in operative engagement with the differential device; an actuating arm; means operatively connecting the square-root cam and the actuating arm, whereby the factor $$\sqrt{H_1-H_2}$$

is applied to the actuating arm; means responsive to the liquid level in one of the float chambers and directly connected to the actuating arm, thereby applying the factor $H_2$ to that arm; recording mechanism, and means controlling said recording mechanism from said actuating arm.

2. In an apparatus for measuring the flow of liquids in an open channel, the combination of restrictive means for creating a pressure difference at spaced points along the channel when there is flow, a float chamber in communication with the channel upstream of said means, a float chamber in communication with the channel at the restricted section thereof; a float in each of said chambers; a differential mechanism; means operatively connecting the two floats with the differential mechanism; a cam in operative engagement with said differential mechanism and actuated thereby; a pivoted curved arm; a connecting arm rigidly secured at one end, to the curved arm, and in operative engagement, at its other end, with said cam, for transmitting movement from said cam to said curved arm; a link in operative engagement with, and adapted to move back and forth along said pivoted curved arm; recording mechanism; an actuating arm interconnecting said link and said recording mechanism, whereby movement of said link controls the recording mechanism; and means controlled by the liquid level in the float chamber connected to the restricted section of the channel, said means being connected to said actuating arm for moving said arm directly in response to changes of liquid level in that float chamber connected to the restricted section of the channel.

In testimony that we claim the foregoing as our invention, we have signed our names this tenth day of March, 1930.

WALTER GEORGE KENT.
JACK REGINALD HOVENDEN, and
ALICE HARRIET HOVENDEN,
*Executors of Edward William Hovenden, Deceased.*